United States Patent
Meadows

(10) Patent No.: US 7,308,118 B1
(45) Date of Patent: Dec. 11, 2007

(54) BUILDING SECURITY, OCCUPANT SAFETY, AND EMERGENCY RESPONSE

(75) Inventor: Roy E. Meadows, Macedonia, OH (US)

(73) Assignee: A. Jay Simecek, Bedford Heights, OH (US)

( * ) Notice: Subject to any disclaimer, the term of this patent is extended or adjusted under 35 U.S.C. 154(b) by 715 days.

(21) Appl. No.: 10/633,908

(22) Filed: Aug. 4, 2003

(51) Int. Cl.
*G06K 9/00* (2006.01)
(52) U.S. Cl. .................. 382/113; 340/524; 715/734
(58) Field of Classification Search ............. 707/7; 455/410; 340/541, 524, 525, 500, 540; 715/734; 382/113
See application file for complete search history.

(56) References Cited

U.S. PATENT DOCUMENTS

| | | | |
|---|---|---|---|
| 6,778,071 B2* | 8/2004 | Megerle | 340/332 |
| 2004/0036579 A1* | 2/2004 | Megerle | 340/332 |
| 2005/0086227 A1* | 4/2005 | Sullivan et al. | 707/7 |
| 2005/0146429 A1* | 7/2005 | Spoltore et al. | 340/525 |
| 2005/0245232 A1* | 11/2005 | Jakober et al. | 455/410 |
| 2005/0289467 A1* | 12/2005 | Imhof et al. | 715/734 |
| 2006/0010388 A1* | 1/2006 | Imhof et al. | 715/734 |
| 2006/0049933 A1* | 3/2006 | Kelley et al. | 340/524 |
| 2006/0109113 A1* | 5/2006 | Reyes et al. | 340/541 |

* cited by examiner

*Primary Examiner*—Samir Ahmed
*Assistant Examiner*—Ehsan D Mafi
(74) *Attorney, Agent, or Firm*—Frederick L. Tolhurst, Esq.; Cohen & Grigsby, P.C.

(57) ABSTRACT

An improved system and method for building security and occupant safety wherein a digital image of plan view of a selected floor of a building is prepared from a physical drawing. The digital image shows the substantial architectural features of the building, including external walls (10) and internal walls (12). In the digital image, the building floor is divided into several zones (14) and each of the zones is broken into segments (16). Each of the segments (16) is identified by alpha/numeric characters or other symbols by which emergency responders or other building occupants can navigate the building.

26 Claims, 2 Drawing Sheets

BUILDING SECURITY, OCCUPANT SAFETY, AND EMERGENCY RESPONSE

BACKGROUND OF THE INVENTION

1. Field of the Invention

The presently disclosed invention relates to systems and methods for improving security and, more particularly, for improving the security of buildings 2. Description of the Prior Art For many years, the design and construction of buildings, particularly public buildings such as schools, hospitals, hotels and the like, had various shortcomings in terms of restricting or controlling ingress and egress to/from the building. Much of the attention in the security field has been addressed to controlling the ingress and egress to/from the building. Limiting the access by unauthorized or unwanted persons has continued to be a high priority and the focus on this need has only further increased in light of recent terrorist attacks within the United States.

However, a number of different but related facets of security also require further attention and improvement. One of these areas is the need to facilitate the ingress and egress to/from the building under certain circumstances. For example, in the event of a fire or a bomb threat, there is an urgent need to facilitate the movement of occupants to locations within or outside of the building. Frequently when such circumstances arise, emergency responders such as firemen, paramedics, and police must gain access to the same structure to perform various emergency services such as helping to coordinate the building evacuation, control a fire, neutralize a human threat as well as other purposes. At the same time, the evacuation of the building must occur under circumstances where there is substantial confusion. In even more difficult circumstances, the evacuation must be attempted under conditions of limited visibility or access due to building collapse, fire, smoke or the like.

In addition to the difficulties of two-way pedestrian traffic that must occur in an adverse or physically dangerous environment, it is common that at least some of the occupants and, under some circumstances, some of the emergency responders are unfamiliar with the structure. This results in added difficulty for them to achieve their respective goals.

In recognition of these and other problems and difficulties, there have been a number of attempts to better inform and educate building occupants as well as emergency responders so that they can better deal with emergency situations that may occur. For example, several years ago, laws were passed to require the owners of industrial buildings to advise the local fire and emergency agencies of hazardous substances that were maintained at an industrial facility that could increase the intensity or lethality of a fire. In other instances, laws required educational, commercial, and public institutions to meet certain construction specifications that were intended to improve the awareness of occupants with regard to safety issues and to improve the movement of occupants through the structure—particularly during adverse conditions.

Compliance with such laws has become another important obligation of building owners. While the laws specify a necessary result, it is not always clear what conduct or performance by the regulated community is necessary in order to comply with the law in a way that will achieve that result. Furthermore, such laws are necessarily general in nature and are not specific to particular buildings, essentially all of which have unique features so that they are different from each other in significant ways.

Accordingly, in the prior art there has been a long-felt need to improve the efficiency and reliability of emergency egress and ingress to buildings. More particularly, there has been a need to improve the speed at which emergency responders can deliver emergency services in a rapid, predictable and repeatable manner, or in which a building can be evacuated.

SUMMARY OF THE INVENTION

In accordance with the presently disclosed invention, a system for developing an emergency plan to execute the steps of collecting data to define the architectural features of a building. A plan view of at least one floor of the building is based on the collected data. The plan view is organized into at least one coded zone that is broken into segments. The coding can be by means of color, geometric shapes, or other visual coding device or convention. Each segment of the color-coded zone is associated with an alpha/numeric character that is unique to that zone. The completed plan is stored at a location that is remote from the building and where it is available to emergency responders.

Preferably, the segments of the color-coded zone is defined by internal and external walls of the building wherein physically adjacent segments are associated with alpha/numeric characters that are in a selected pattern.

Also preferably, the color-coded zones and the segments of the zones are added to the image of the collected data and stored on a digital data file or readable copy that can be accessed by emergency responders. Such emergency responders maintain such digital data files in a library of digital data files, each of said files corresponding to a building within the service area of the emergency responder.

Other objects, advantages and embodiments of the presently disclosed invention will become apparent to those skilled in the art as a presently preferred embodiment of the invention and method for practicing the same proceeds.

BRIEF DESCRIPTION OF THE DRAWINGS

A presently preferred embodiment of the presently disclosed invention is shown and described in connection with the accompanying drawings wherein.

DESCRIPTION OF A PRESENTLY PREFERRED EMBODIMENT

The subject invention provides a color-coded, segmented plan view of a building that shows those architectural features that are generally of interest to emergency responders such as police, firemen, paramedics and others when they are trying to accomplish efficient, rapid, and reliable ingress/egress into/out of a building. In the example of the preferred embodiment, the plan view is stored as a digital image file on a storage media such as a floppy disc, CD, hard drive or other similar device. However, various alternative formats for storage and display of the plan view of the building will be apparent to those skilled in the art such as computer hard drives, and disc carousels.

Figure 1:
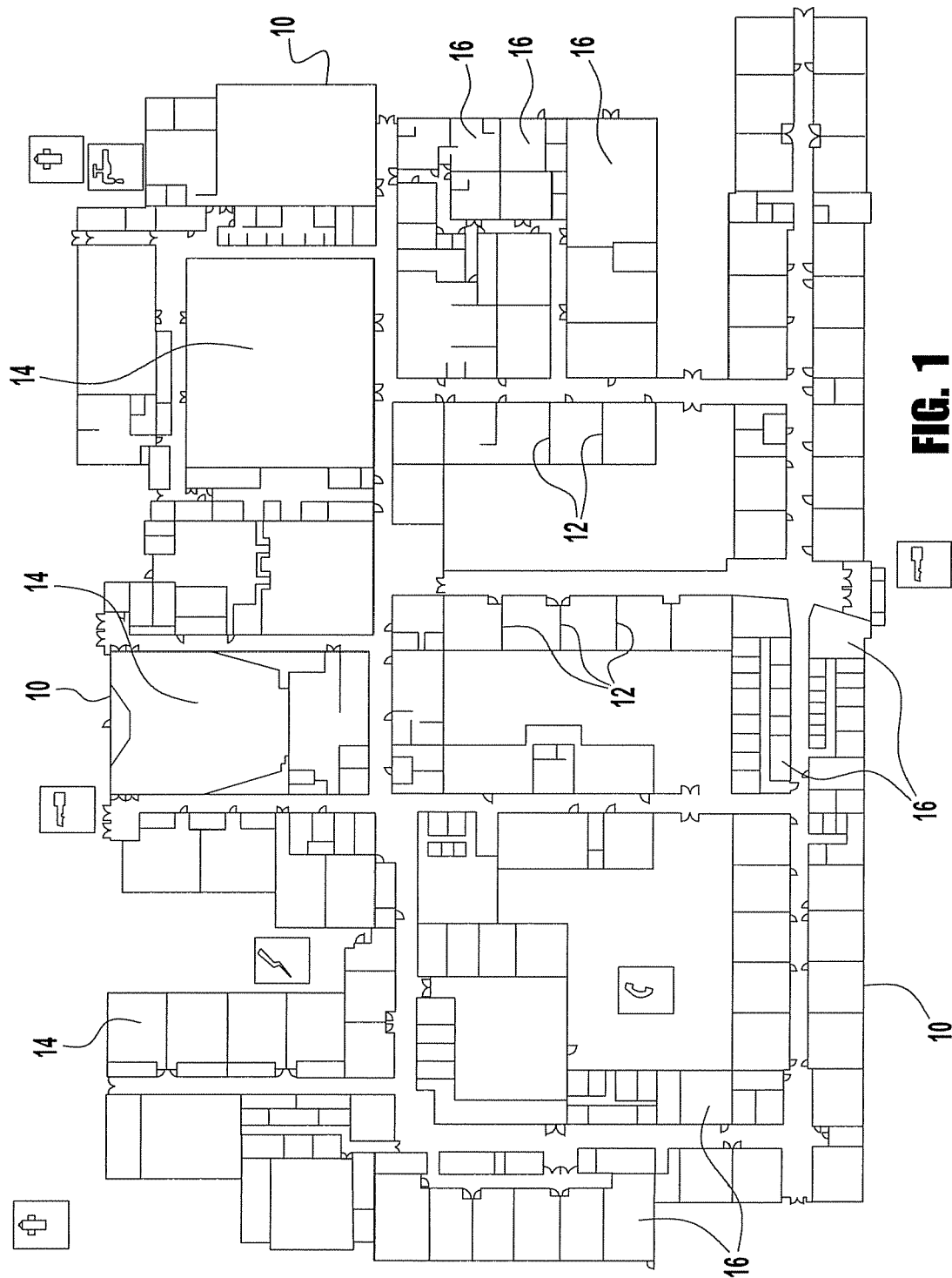
FIG. 1 illustrates a specimen plan view of a building, said plan view including three color-coded zones and numbered segments in each of said zones.

The stored file is a digital image that is developed from specific data pertaining to the building for which the emergency plan is being developed. The data is collected by creating a digital image of a plan drawing of a least one floor of the building as further illustrated in FIG. 1. In FIG. 1, a plan view of a selected floor of the building is prepared from a suitable, accurate plan view of the building that shows the substantial architectural features of the building, including all external and internal walls on the respective floor of the building. The external walls 10 define the exterior envelope or footprint of the building. The internal walls 12 for the same floor are also shown in FIG. 1 and generally define the interior rooms in cooperation with the exterior walls.

Figure 2:
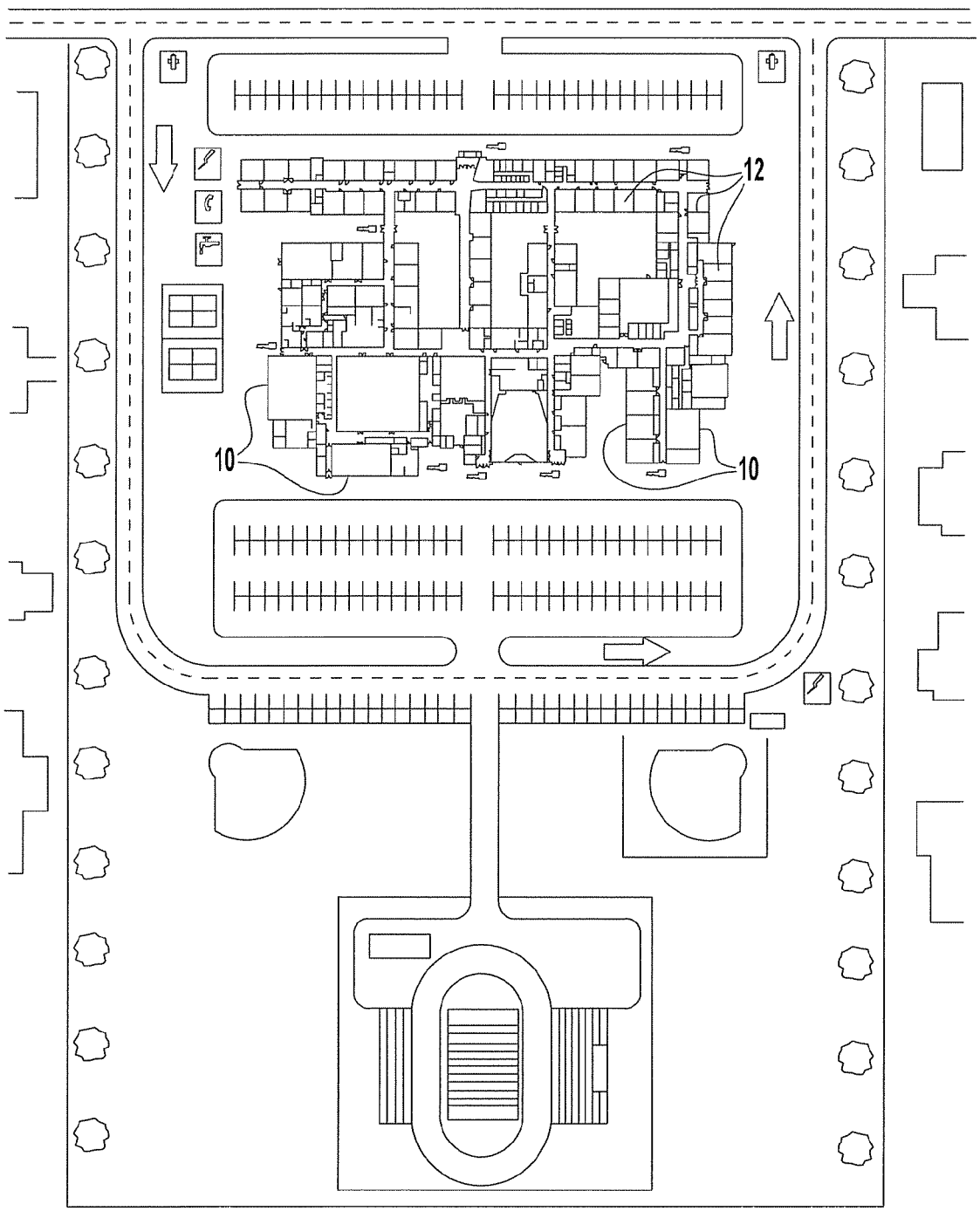
FIG. 2 illustrates the portion of the system that is used for collecting data to define the architectural features of a building.

Other architectural features could include elevators, stairwells, key lock boxes, door swings, utility shut-off locations, roof-top access, directional signage, emergency exits, and similar features that would be expected to be of interest to an emergency responder. Architectural features can also include landscaping and other land improvements such as parking lots, fire hydrants, trees, retention basins, and other architectural features that would be of interest to emergency responders. As shown in FIG. 2, these can be appropriately added to a drawing of the building footprint by selecting the appropriate symbol that is displayed on a decal that is included in an assortment of decals and applying it to the drawing at the location that corresponds to the actual land improvement. In addition, any features for which no decal is available can be indicated on the drawing by sketching or other suitable means.

The building floor is divided into several zones 14. Each zone 14 is coded so that it is readily distinguishable from the other zones on the same floor. Such coding can be by color-coding or by way of a common design or by other equivalent means. In the example of the preferred embodiment, a color-coding scheme is used to identify different zones. Each of the zones 14 is broken further into segments 16 that are defined by the external and internal walls of the building. In the example of the preferred embodiment, each of the segments are identified by a number, although other alpha/numeric characters could also be used and are within the scope of the disclosed invention. The numbers that identify each segment follow a rational numbering system and are unique within the particular color-coded zone. In the case of some segments, as, for example, bathrooms, the numbering system assigns a number to a segment that has no other numeric address or identification.

In the preferred embodiment, the plan drawing is recorded in digital format and saved on a disc. Alternatively, the digital file could be stored on another digital media such as a computer hard drive or other storage media. The digital file is saved in a read-only format to deter any unauthorized tampering with the stored image.

The saved digital drawing is maintained off the site at a location that will be convenient to an emergency responder. An additional copy is also maintained on-site for immediate on-site reference. For example, the saved file would be stored in a digital memory that is connected to an Ethernet or similar networking facility or device with the digital memory being accessible through the network by an emergency responder from their own respective computer system that is also connected to the network. Alternative storage and retrieval mechanisms are also possible. For example, the digital drawing could be maintained on a remote data storage file that is accessible though internet connections or other remote access.

If the building has multiple floors, the plan can be similarly developed for some or all of the other floors on a floor by floor basis. Also according to the preferred embodiment, the interior and/or exterior doors are provided with insignias such as signs and/or decals that are located directly on the door or on the adjacent room interior. Such insignias (signs and/or decals) indicate to the emergency responder which color-coded zones and segments of those zones are accessible from that particular door. This instructs the emergency responder with regard to the most efficient point of entry.

As alternative to the storage of a plan drawing on the storage media, the stored image of the building can also be in the form of a video or a virtual tour of the building. As used herein, the digitally stored image includes videos, virtual tours, still images and other representations of the building such as would become apparent to those skilled in the art based on the disclosure presented herein.

In the application of the preferred embodiment, an emergency responder of other building occupants could use the coded zones 14 and the alpha/numeric segments 16 to navigate the building. For example, in the event that an emergency situation would arise at the building, the emergency response dispatcher could consult the building plan that is stored on the floppy disc, hard drive or other storage device. The dispatcher can communicate with parties at the building and even inside the building via telephone or otherwise and define the location of the problem or danger in terms of the color-coded zone(s) 14 and the numbered segment(s) 16. The dispatcher can then instruct the emergency responder with instructions for approaching or traversing the building. The instructions would be generic for any building for which a plan is available so that persons could familiarize themselves with the system of coded zones and segments in advance. For example, a dispatcher could review preferred ingress and egress routes while the emergency responder is still enroute to the building.

Other systems for communicating with the emergency responders will also become apparent to those skilled in the art from the description of the presently disclosed embodiment. For example, if the emergency response vehicle has the on-board communications support, the dispatcher can transmit a copy of the plan to the responder while they are still en route and then discuss it with the emergency responder while they are viewing a copy of the plan to which the dispatcher is referring. If the emergency response vehicle has the necessary supporting equipment, the responder could access the data base directly and view the plan from a hard drive, CD or over the internet. If the emergency response vehicle is not equipped to support viewing stored digital images, then the responder can carry a hard copy version of the plan drawings.

While a particular preferred embodiment of the disclosed invention and method for practicing the same are shown and described herein, the disclosed invention is not strictly limited thereto but can be otherwise variously embodied within the scope of the following claims.

I claim:

1. A system for developing an emergency plan for a building, said system executing the steps of:
   collecting data that defines architectural features of a building that has walls;
   developing a floor-by-floor digital image of the building, said floor-by-floor digital image being based on said collected data;
   organizing the digital image of at least one floor of the building into one or more coded zones, said coded zones being broken into segments that are defined by walls of the building;

associating the segments of each coded zone with alpha/numeric characters that are unique to said coded zone; and maintaining said floor-by-floor digital image at a location that is outside of said building and that is also available to emergency responders.

2. The system of claim 1 wherein the segments of each of said coded zones are defined spaces within said building and wherein physically adjacent members of said segments within a zone are identified by a symbol or combination of symbols according to a selected pattern.

3. The system of claim 2 wherein said floor-by-floor digital image is retained by an emergency responder.

4. The system of claim 3 wherein said system further includes a set of symbols that represent architectural features, and wherein said data collection includes combining said symbols with a drawing of at least one floor of the building, said drawing showing the exterior and interior walls that are located on that floor.

5. The system of claim 4 wherein said set of symbols are decals that are applied to the drawing of the building.

6. The system of claim 5 wherein said step of developing a digital image of the building includes developing a plan view of at least one floor of the building based on a drawing of at least one floor of the building.

7. The system of claim 6 wherein the coded zones of the digital image of at least one floor of the building are color-coded zones.

8. The system of claim 5 wherein said digital image is stored as a read-only digital file.

9. The system of claim 1 wherein the segments of the coded zones of the building are defined by internal and external walls of the building.

10. The system of claim 9 wherein the alpha/numeric characters are added to the digital image of at least one floor of the building.

11. The system of claim 9 further including door insignias, said door insignias being applied in the vicinity of at least one door of at least one floor of the building to indicate the zone and segments that are accessed by entry through said door.

12. The system of claim 11 wherein said door insignias are applied in the vicinity of an exterior door of at least one floor of the building to indicate the zone and segments that are accessed by entry through said exterior door.

13. The system of claim 11 wherein said door insignias are applied in the vicinity of an interior door of at least one floor of the building to indicate the zone and segments that are accessed by entry through said interior door.

14. The system of claim 11 wherein the coded zones are added to the digital image of at least one floor of the building as color-coded zones and wherein said door insignias have a color that corresponds to the color of the zones that are accessed through the door in the vicinity of said insignia, and wherein said door insignias also have alpha/numeric characters that correspond to the segments that can be accessed through said door.

15. The method of claim 14 wherein said digital image is stored as a read-only digital file.

16. A method for developing an emergency plan for a building, said method comprising the steps of:

collecting data that defines architectural features of a building that has walls;

developing a floor-by-floor digital image of the building, said floor-by-floor digital image being based on said collected data;

organizing the digital image of at least one floor of the building into one or more coded zones, said coded zones being broken into segments that are defined by walls of the building;

associating the segments of each coded zone of said building with symbols or combinations of symbols that are unique to that segment; and maintaining said floor-by-floor digital image at a location that is available to emergency responders.

17. The method of claim 16 wherein the segments of each of said coded zones are defined spaces within said building and wherein physically adjacent members of said segments within a zone are identified by a symbol or combination of symbols according to a selected pattern.

18. The method of claim 17 wherein said floor-by-floor digital image is retained by an emergency responder.

19. The method of claim 18 wherein data collection includes combining symbols that represent architectural features with a drawing of at least one floor of the building, said drawing showing the exterior and interior walls that are located on that floor.

20. The method of claim 19 wherein said set of symbols are decals that are applied to the drawing of the building.

21. The method of claim 20 wherein said step of developing a digital image of the building includes developing a plan view of at least one floor of the building based on a drawing of at least one floor of the building.

22. The method of claim 17 wherein the coded zones of the digital image of at least one floor of the building are color-coded zones.

23. The method of claim 16 wherein the segments of the coded zones of the building are defined by internal and external walls of the building.

24. The method of claim 23 wherein the symbols that are associated with segments of each coded zone are alpha/numeric characters that are added to the digital image of at least one floor of the building.

25. The method of claim 16 further including applying door insignias in the vicinity of at least one door of at least one floor of the building to indicate the zone and segments that are accessed by entry through said door.

26. The method of claim 25 wherein the coded zones of the digital image of at least one floor of the building are color-coded zones and wherein the symbols that are associated with segments of each coded zone are alpha/numeric characters, and also wherein said door insignias have a color that corresponds to the color of the zones that are accessed through the door in the vicinity of said insignia, and wherein said door insignias also have alpha/numeric characters that correspond to the alpha/numeric characters of the segments that can be accessed through said door.

* * * * *